United States Patent
Cotton

[11] 3,826,125
[45] July 30, 1974

[54] PRESSURE VESSEL TESTING
[75] Inventor: Michael John Cotton, Mytholmroyd, England
[73] Assignee: NU Swift International Limited, Yorkshire, England
[22] Filed: Mar. 9, 1973
[21] Appl. No.: 339,885

[52] U.S. Cl. .................................................. 73/4 R
[51] Int. Cl. .......................................... G01l 27/00
[58] Field of Search ....................................... 73/4 R

[56] References Cited
UNITED STATES PATENTS
2,422,702  6/1947  Rodanet .............................. 73/4 R Primary Examiner—Donald O. Woodiel
Attorney, Agent, or Firm—Norris & Bateman

[57] ABSTRACT

An indicator on a pressure vessel such as a fire extinguisher adapted to show internal fluid pressure is tested by applying an external source of fluid pressure to the indicator acting in opposition to the internal pressure, preferably on a special test stand having arrangements for supporting the pressure vessel and applying an external pressurized chamber in sealing relation onto the indicator, and observing the effect of the applied external pressure on operation of the indicator.

12 Claims, 6 Drawing Figures

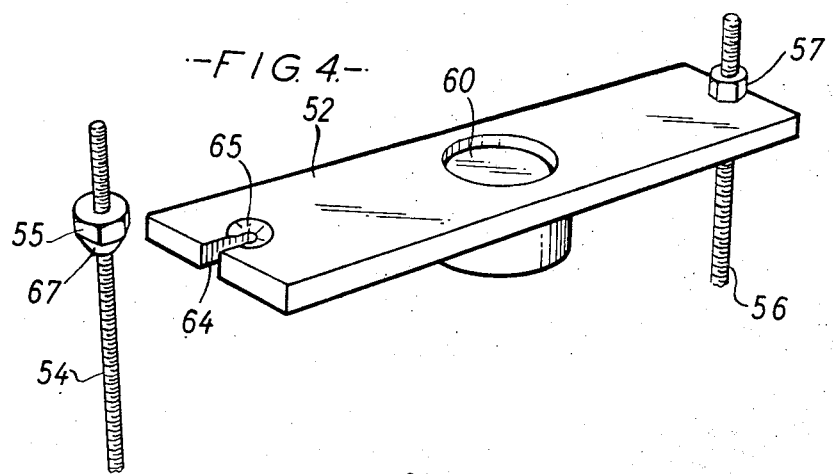
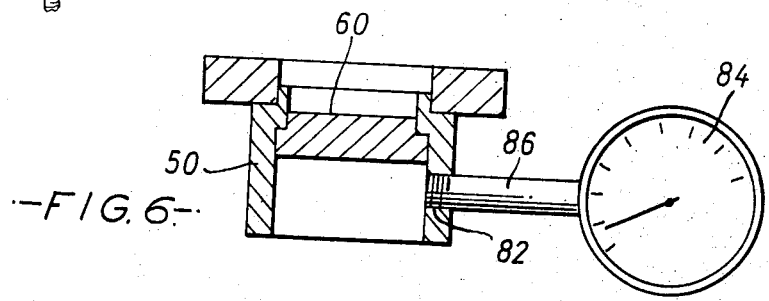
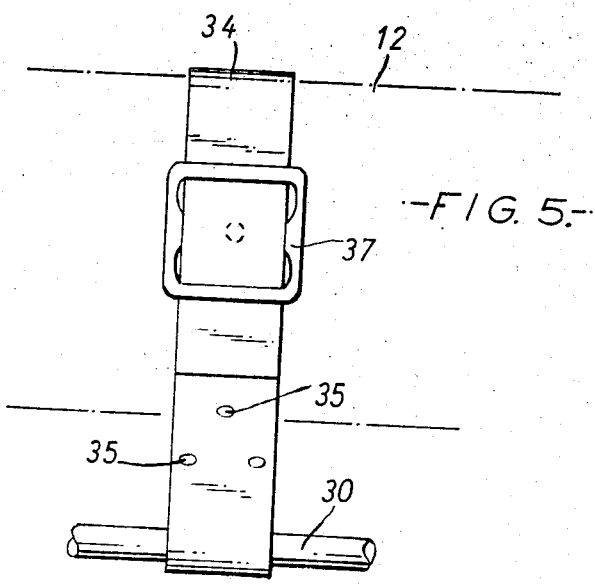

PRESSURE VESSEL TESTING

Pressure vessels which are required to retain a fluid (liquid or gaseous) under pressure, are sometimes provided with pressure indicators, visible on the outside of the vessel, and adapted to indicate the state of pressure within the vessel. For example, a stored pressure portable fire extinguisher must have a certain internal pressure if it is to be effective, and a simple pressure gauge can be fitted to the extinguisher to indicate on the outside whether the required pressure appertains within it.

Although in the instance of a fire extinguisher the indicator must be in some sense a pressure gauge, it is to be understood that it does not necessarily show what the pressure is in terms of specific units of pressure, nor is it required to read off the pressure accurately, but only to indicate that the extinguisher is operative or inoperative or that it requires re-pressurising. One type of indicator used on fire extinguishers simply has a needle movable over a "dial" with a red coloured zone and a green coloured zone. As long as the pressure is high enough to operate the extinguisher, the needle will lie over the green zone, but if the pressure falls too low to be effective, the needle will lie over the red zone. In another instance, the indicator consists of a rod or tube slidable through a hole in the wall of the extinguisher, the length of its projection outside the extinguisher being related to the internal pressure. Here again the rod or tube is not graduated for accurate pressure readings, but merely has red and green zones, and so long as part of the green zone is visible outside the extinguisher, the pressure inside it should be adequate for operation. It will be appreciated therefore, that the expression "pressure indicator" is used herein in a broad sense to include relatively imprecise devices, although it should be understood that the invention is also applicable to vessels fitted with accurately graduated gauges.

One of the problems of a stored pressure vessel fitted with a pressure indicator is that of ensuring that the indicator is operating correctly. If the indicator sticks in a position where it shows that an adequate internal pressure exists, it will give a false indication if the pressure should fall below the critical operative level. In the instance of a fire extinguisher, this could be dangerous because the indicator would indicate that the extinguisher was operative when this was not the case.

According to a first aspect of this invention a method of testing whether a pressure indicator fitted to a pressure vessel and adapted to indicate the internal pressure, is operating correctly or not, comprises applying a fluid under pressure, from a source external to the vessel, to the indicator in a manner to oppose the action of the internal fluid pressure, and observing any resultant movement of the indicator. Clearly, if the indicator is sticking, it will not move under the application of the external fluid pressure. If, on the other hand, the indicator is operating correctly, then it will move in a direction indicating a reduction in internal pressure. Hence the state of the indicator (operative or inoperative) is capable of easy visual observation.

According to a preferred feature of the invention a pressurising chamber is applied over the pressure indicator making a fluid tight joint with the vessel around the indicator, and then fluid under pressure is admitted to the interior of the pressurising chamber. This method relies on the fluid under pressure being able to flow through any cover(s) fitted to the indicator on to the actuating mechanism of the indicator. It may be necessary to remove this cover or covers from the indicator before the pressurising chamber is fitted.

Preferably the pressurising chamber is drawn into sealing engagement with the vessel by a tensioning apparatus active between the pressurising chamber and the vessel itself.

According to a second aspect of the invention, apparatus for determining whether a pressure indicator fitted to a pressure vessel and adapted to indicate the internal pressure, is operating correctly or not, comprises a pressure chamber adapted to be secured to the vessel around the indicator, and to enclose the indicator in a substantially pressure tight manner and a source of fluid pressure in communication with the pressure chamber.

The pressure chamber may be adapted to seal over a specific size of indicator, or it could be adapted to form a seal around indicators of various sizes. For example, if the indicators have cylindrical outer walls, then a flexible sealing ring on the inside of the chamber could seal on to indicators of a range of diameters within the limits of the compressibility of the sealing ring. Alternatively if the chamber were made of larger internal dimensions than the largest indicator to be accommodated, it could be made to seal on the vessel itself.

Preferably the source of pressure is a manually operable pump, for example a foot pump, but as an alternative a container for pressurised gas with means for controlling the flow of gas from the container could be employed. In any event it is preferred that the complete apparatus shall be portable.

In a preferred arrangement, the apparatus includes a cradle for the vessel, and tie bar means connected between the pressure chamber and the cradle for pulling the chamber into sealing engagement with the vessel.

One form of apparatus intended for testing the state of a pressure indicator on a fire extinguisher, and its method of operation, will now be described by way of example only, with reference to the accompanying drawings, in which:

FIG. 4 is a perspective view of a clamping plate, FIG. 5 is a part side view looking on the opposite side to FIG. 1, and FIG. 6 is a cross-section through an alternative type of pressure chamber.

Figure 2:
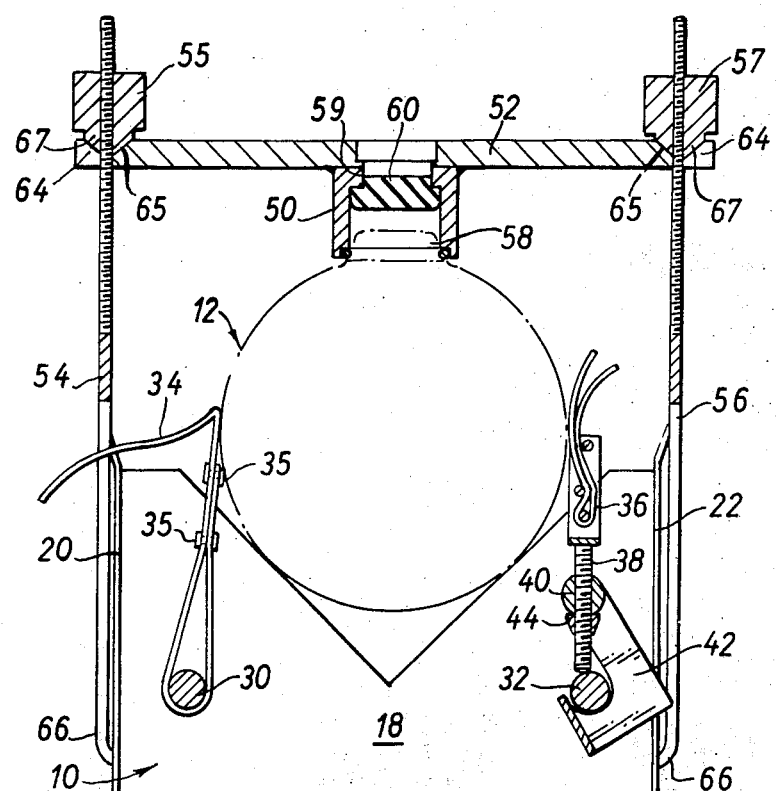
FIG. 2 is a section on the line A–B–C–D in FIG. 1.

The apparatus includes a cradle 10 for receiving a portable fire extinguisher 12 laid on its side in the cradle. The extinguisher is of the well known type which has a generally cylindrical body. The cradle consists of a metal baseplate 14, and a pair of Vee blocks 16 and 18 upstanding from the baseplate. The dimensions of the Vee blocks are such that they provide a firm support for a fire extinguisher, as is apparent from FIG. 2. The use of Vee blocks enables fire extinguishers of different sizes to be tested on the apparatus, and this increases the versatility of the apparatus.

A pair of location plates 20 and 22 is provided these plates being secured to respective opposite sides of the Vee block 18, and projecting beyond one end and above that block. In the end projection of the plates there are formed series of attachment holes 26, and a further attachment hole 28 is formed in the upward extension of each plate 20, 22.

A pair of metal struts 30 and 32 extends between the two vee blocks, these struts being arranged one on each side of the bottoms of the Vee grooves. For holding the body of the fire extinguisher firmly on the cradle there is a strong strap 34 which at one end is looped and fastened around the strut 30. The looped end of the strap is secured by rivets 35 so that this end firmly anchors the strap on to the strut 30, and at the other end is threaded through an adjustable buckle 36. A fixed buckle 37 is riveted on the strap 34 near to looped end and the "free" end of the strap after passing through the buckle 36 is threaded into the fixed buckel 37 which holds the "free" end of the strap and prevents the strap slipping through the buckle 36 under tension. The adjustable buckle 36 has a screw-threaded extension rod 38 which passes through a clearance hole in a bearing rod 40 which forms part of a hook 42. A wing nut 44 engages on the screw-threaded extension rod 38 on the underside of the rod 40, and by turning this nut, it is possible to draw the adjustable buckle closer to the hook 42. In the inoperative position, the "free" end of the strap 34 after passing through the adjustable buckle is looped through the fixed buckle.

For securing the extinguisher on the cradle the strap 34 is taken over the extinguisher body, and the hook 42 is placed adjacent to the strut 32. The strap can then be adjusted to approximately the required length by drawing it through the adjustable buckle 36. The hook 42 is engaged under the strut 32 and final tightening is achieved by turning the nut 44 to draw the hook tightly on to the strut 32.

The apparatus also includes a pressure chamber 50 carried by a clamping bar 52 and a pair of tie-bars 54 and 56. The apparatus is designed for use on a range of extinguishers equipped with one size of dial gauge type pressure indicator (such as that illustrated at 58 in FIGS. 2 and 3). The pressure chamber 50 is generally in the form of an open ended cylinder, the base of which easily accommodates the cylindrical pressure indicator 58 and as shown in the drawings, the chamber is considerably deeper than the indicator 58. An annular lip 59 projects inwardly from the upper end of the chamber and a thick sight glass 60 is fitted in the upper part of the chamber and retained by the lip 59 and forms a fluid tight seal with the walls of the chamber. A Schrader valve 62 (such as those used on the tyres of motor vehicles) is fitted into the cylindrical wall of the pressure chamber.

Figure 3:
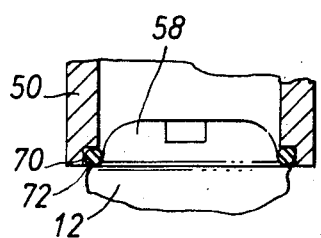
FIG. 3 is a detailed sectional view to a larger scale of a part shown in FIG. 1.

An annular recess 70 is formed in the lower end of the pressure chamber 50, and a rubber O seal ring 72 is provided which is of such dimensions that it is a snug fit within this recess (see FIG. 3). The O-seal 72 is also a good fit on the outside of an indicator 58 of the type on which the apparatus is commonly used.

A bar 52 is fixed to the chamber 50 and extends on opposite sides thereof. Notches 64 are formed in the ends of the bar, and these notches are wide enough to receive the shanks of the tie bars 54 and 56. The tie bars have screw-threaded upper portions, and hooks 66 at their lower ends, these hooks being adapted to fit into the holes 26 or 28 of the plates 20 and 22. Hexagonal nuts 55 and 57 are provided for the respective tie bars 54 and 56. A chamfered countersink 65 is formed at the inner end of each notch 64 and each of the nuts 55 and 57 has a part conical lower part 67, which is a snug fit in its respective countersink 65.

Figure 1:
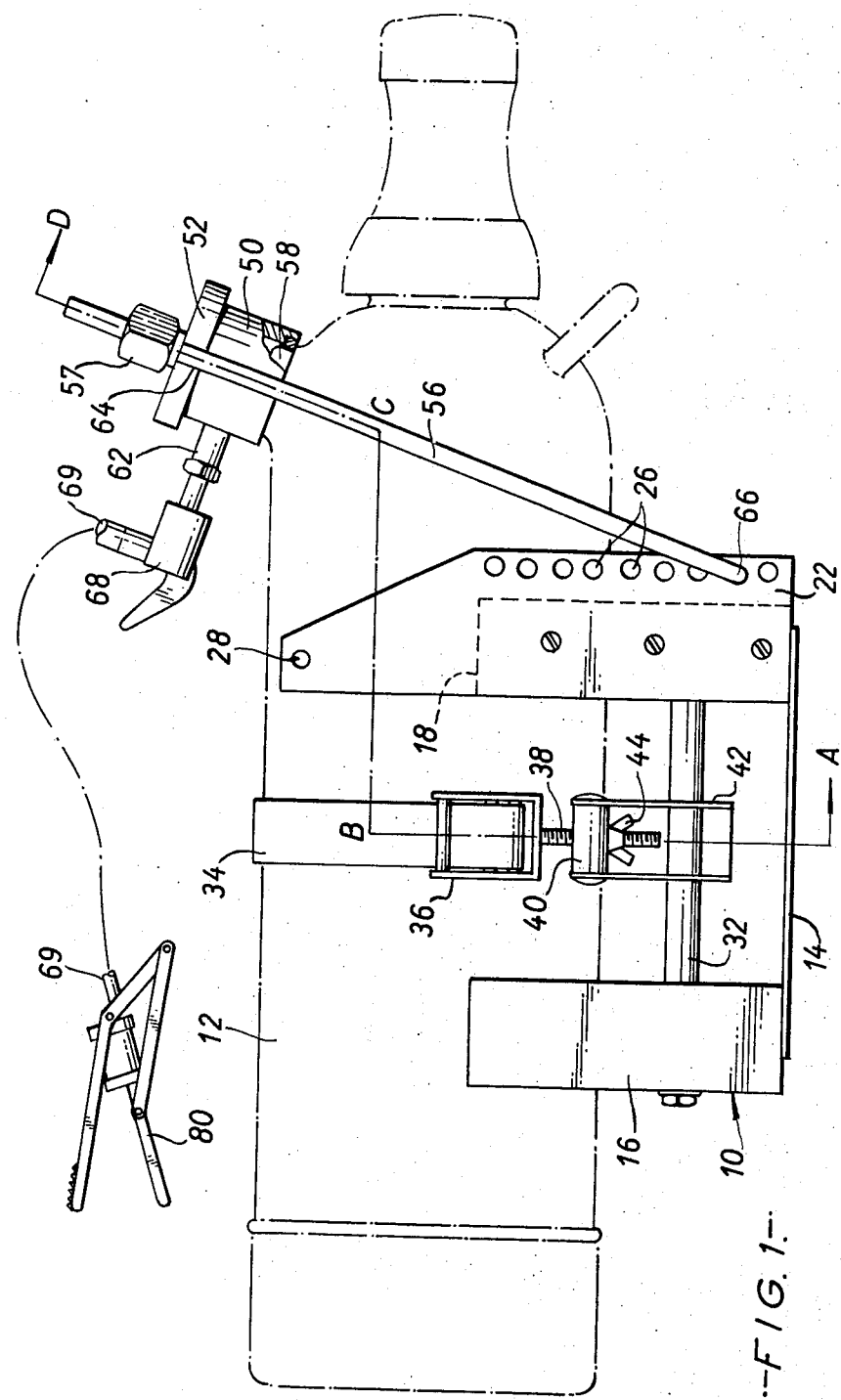
FIG. 1 is a side view of the apparatus in use.

The apparatus is completed by a foot pump 80 of the type used to inflate vehicle tyres, but this pump need only be connected to the pressure chamber 50 when the apparatus is ready for use. In FIG. 1, the outlet end 69 of the foot pump flexible pipe is shown attached to the Schrader valve 62 by the usual cap fitting 68.

To use the apparatus, the extinguisher 12 is placed in the Vee blocks 16 and 18 of the cradle 10, with the top end of the extinguisher at the same end as the location plates 20 and 22, and with the pressure indicator 58 uppermost. The glass or plastics cover of the indicator is removed. The "free" end of the strap 34 is then removed from the fixed buckle 37, carried over the extinguisher body, and drawn through the adjustable buckle 36. With the hook 42 adjacent to the strut 32 the adjustable buckle 36 is slid along the strap to shorten the effective length of the strap such that it will tighten around the extinguisher body, and then the free end of the strap is again threaded into the fixed buckle 37 to lock the strap. The hook 42 is then engaged under the strut 32.

The extinguisher is then orientated in the cradle so that the centre line of the indicator 58 is in alignment with one of the holes 26 or 28 in each location plate 22 when viewed from the side, and then the grip of the strap on the extinguisher is tightened by turning the wing nut 44 pulling the hook 42 on to the strut 32 and pulling the buckle 36 towards the hook 42. At this statge, the hooked ends of the tie bars 54 and 56 are engaged in those holes 26 or 28 with which the centre-line of the indicator is aligned.

Next, the O-seal is placed over the indicator 58, and the pressure chamber 50 is placed over the indicator, the O-ring being received in the recess 70. It is important to ensure that the chamber 50 fits squarely over the indicator to effect a good seal with the indicator and/or the body of the extinguisher. The tie bars 54 and 56 are then engaged in their respective notches 64 and the nuts 55 and 57 are tightened, so that the lower parts 67 of the nuts settle into their respective countersinks 65 in the plate 52, and the tie bars are subjected to tension, and press the pressure chamber firmly on to the extinguisher body to make a fluid pressure tight seal between the chamber and the body.

The cap fitting 68 is placed on the Schrader valve 62, and the foot pump 80 is operated. Pressure is thus increased in the pressure chamber 50, and the air under pressure in the chamber flows into the indicator 58, but of course it is on the opposite side of the actuating mechanism of the indicator to the pressure within the extinguisher. Consequently the pressure applied to the indicator by the test apparatus is in opposition to that applied to the indicator by the internal pressure of the extinguisher. As a result, the needle or other indicator of the device 58 should be deflected from its "reading" position in a downwards direction. Such a movement will show that the indicator is operative.

If this test fails to produce movement of the indicator, the test must be repeated with the cover of the indicator gauge removed, in case that cover were preventing application of the applied external pressure. If there is still no movement, it can be concluded that the indicator 58 is jammed.

The extinguisher is released from the cradle by reversing the securing operations, described above.

In an alternative arrangement, which is illustrated in FIG. 5, all the apparatus is identical with that described above excepting that the chamber 50 is formed with a screw-threaded hole 82 in its cylindrical wall to receive the connecting pipe 86 of an accurately calibrated pressure gauge 84.

This alternative apparatus is used in the same way as the apparatus shown in FIGS. 1 to 4, but it is possible to read off on the gauge 84, the actual pressure which is required to overcome the internal pressure of the vessel, and in this way, the indicator 58 can be calibrated.

The pressure indicator 58 may be the pressure gauge disclosed in U.S. letters Pat. No. 3,110,284.

I claim.

1. A method of testing whether a pressure indicator fitted to a pressure vessel and adapted to indicate the internal pressure, is operating correctly or not, comprising applying a fluid under pressure, from a source external to the vessel, to the indicator in a manner to oppose the action of the internal fluid pressure, and observing any resultant movement of the indicator.

2. A method of testing as claimed in claim 1, in which a pressurising chamber is applied over the pressure indicator, and then fluid under pressure is admitted to the interior of the pressurising chamber.

3. A method of testing as claimed in claim 2, in which the pressurising chamber is drawn into sealing engagement with the vessel by a tensioning apparatus active between the pressurising chamber and the vessel itself.

4. Portable apparatus for determining whether a pressure indicator, fitted to and forming part of a pressure vessel and adapted to indicate the internal pressure, is operative or not, comprising a cradle for the pressure vessel, a pressure chamber for covering said indicator and said pressure chamber having sealing means for sealing against said pressure vessel, tension means operative between said pressure chamber and said cradle to urge said pressure chamber into tight engagement with said pressure vessel and fluid flow control means for controlling admission of fluid under pressure into said pressure chamber.

5. Portable apparatus according to claim 4, wherein said pressure chamber is secured to a clamping plate and said tension means comprises a pair of screw-threaded rods each anchored at one of its ends to a part of said cradle one on each side of said cradle, the opposite ends of said rods passing through said clamping plate, and nuts engaging on said rods and engageable with said clamping plate to urge said clamping plate towards said cradle.

6. Portable apparatus as claimed in claim 5, including a resilient sealing ring for engagement between said pressure chamber and said pressure vessel.

7. Portable apparatus according to claim 5, including a pump connected to said fluid flow control means to supply gas under pressure into said pressure chamber.

8. Portable apparatus according to claim 5, including an adjustable length strap for fastening said pressure vessel to said cradle.

9. Portable apparatus for determining whether a pressure indicator fitted to and forming a part of a pressure vessel and adapted to indicate the internal pressure is operative or not, comprising: a cradle having a pair of Vee blocks to receive a cylindrical part of the vessel; flexible strap means for securing said vessel to said cradle said strap means including a sliding buckle for changing the effective length of said strap means, a hook for engagement with a part fixed to said cradle and screw-and-nut means connecting said hook to said strap means; a pressure chamber in the form of a hollow member open at one end and closed by a sight glass at the other end; said pressure chamber having sealing means for engagement with said vessel; fluid flow control means attached to said pressure chamber for admitting fluid under pressure to the interior of said chamber, and tie bar means connected between said cradle and said pressure chamber to urge said chamber into sealing engagement with said vessel.

10. Apparatus for testing whether a pressure indicator fitted to a pressure vessel and adapted to indicate the internal pressure is operating correctly or not, comprising means for mounting said pressure vessel on a test support, and means on said support adapted to be connected to an external source of fluid pressure for applying fluid under pressure to the indicator on the vessel in a manner to oppose the action of the internal fluid pressure on said indicator, said pressure applying means permitting observation of said indicator for determining the operability thereof.

11. Apparatus for testing as claimed in claim 10, in which said means for applying fluid under pressure comprises a pressurizing chamber adapted to be sealingly fitted over the pressure indicator mounted on the vessel.

12. Apparatus for testing as claimed in calim 11, in which securing means is provided on said support for drawing said pressurizing chamber into sealing engagement with the vessel, said securing means comprising a tensioning apparatus operably connected between the pressurizing chamber and the vessel itself.

* * * * *